(No Model.) 5 Sheets—Sheet 1.

N. A. BOYNTON.
WATER HEATER.

No. 407,850. Patented July 30, 1889.

Witnesses:
Arthur Ashley
Walter S. Dodge

Inventor:
Nathaniel A. Boynton
per J. A. Ashley atty.

(No Model.) 5 Sheets—Sheet 2.
N. A. BOYNTON.
WATER HEATER.
No. 407,850. Patented July 30, 1889.
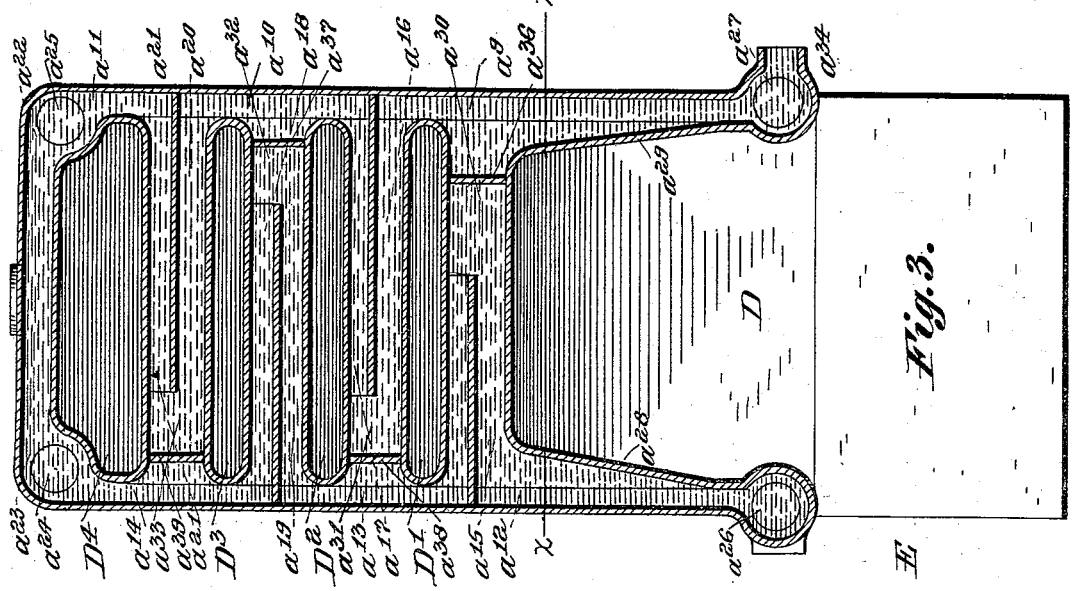
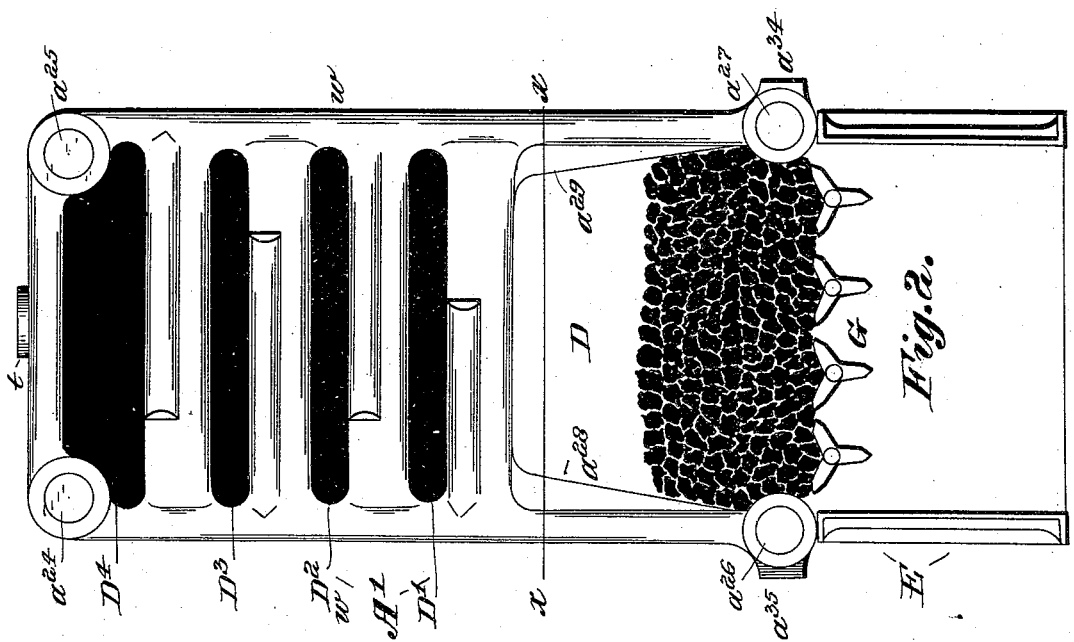
Witnesses:
Arthur Ashley
Walter F. Dodge
Inventor:
Nathaniel A. Boynton
per J. W. Ashley atty.

(No Model.) 5 Sheets—Sheet 3.

N. A. BOYNTON.
WATER HEATER.

No. 407,850. Patented July 30, 1889.

Witnesses:
Arthur Ashley
Walter S. Dodge

Inventor:
Nathaniel A. Boynton
per J. U. Ashley atty.

(No Model.) 5 Sheets—Sheet 4.
N. A. BOYNTON.
WATER HEATER.
No. 407,850. Patented July 30, 1889.
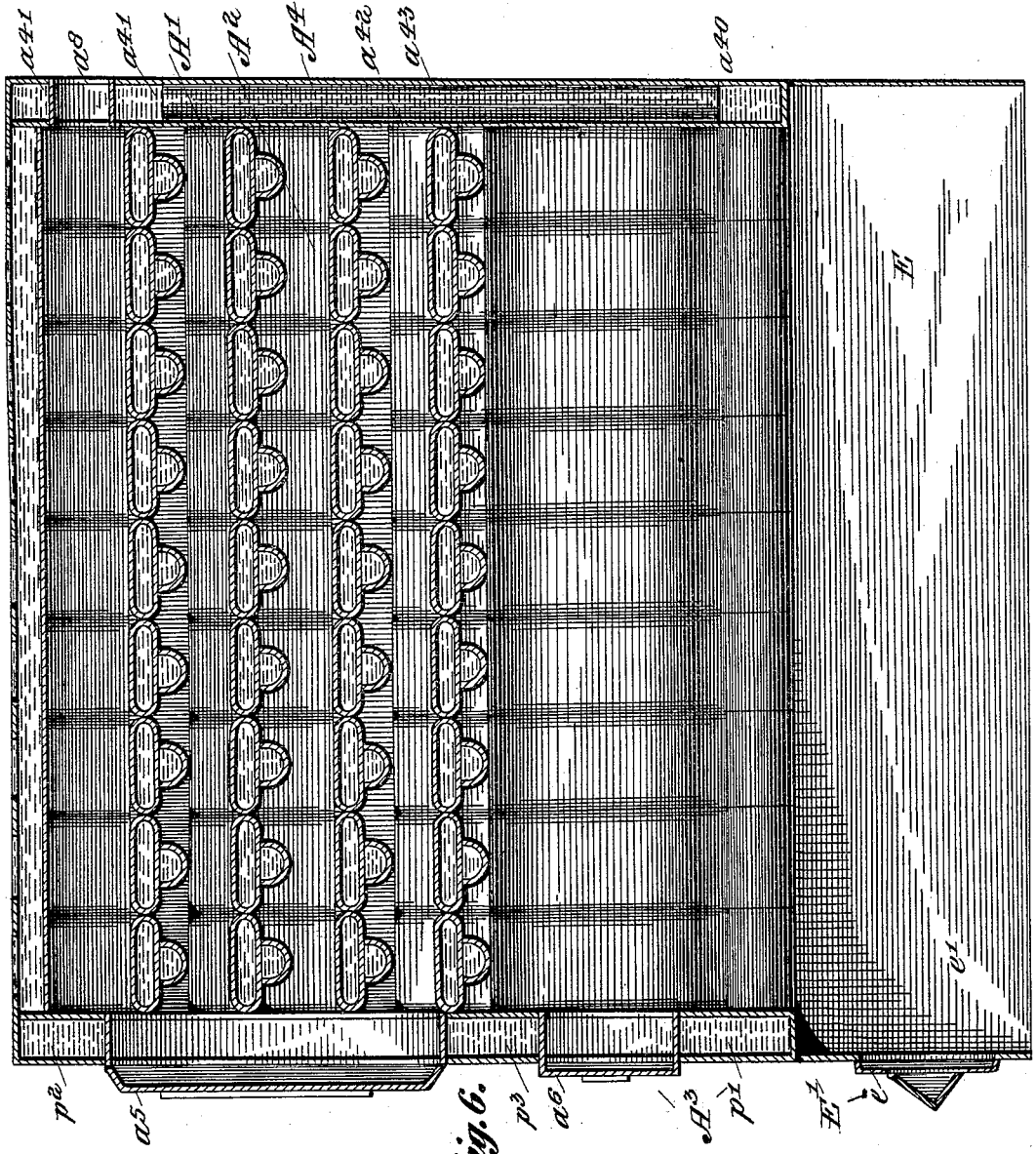

(No Model.) 5 Sheets—Sheet 5.
N. A. BOYNTON.
WATER HEATER.
No. 407,850. Patented July 30, 1889.
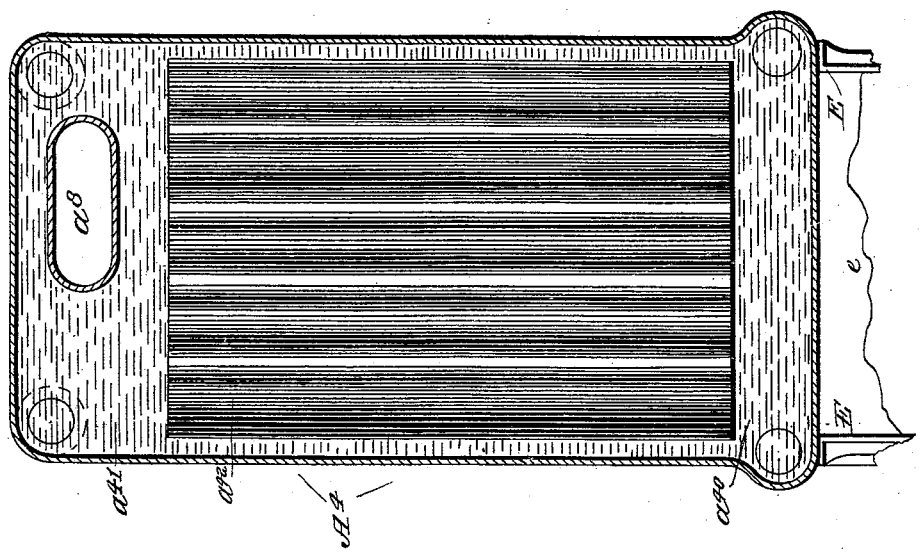
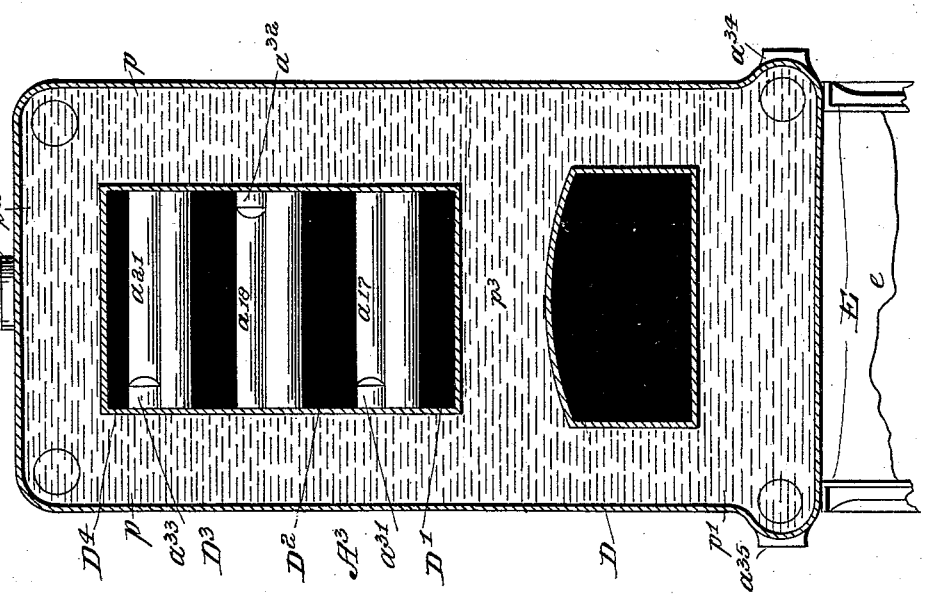
Witnesses:
Arthur Ashley
Walter S. Dodge
Inventor:
Nathaniel A. Boynton
per J. H. Ashley atty.

UNITED STATES PATENT OFFICE.

NATHANIEL A. BOYNTON, OF NEW YORK, N. Y., ASSIGNOR TO THE BOYNTON FURNACE COMPANY, OF SAME PLACE.

WATER-HEATER.

SPECIFICATION forming part of Letters Patent No. 407,850, dated July 30, 1889.

Application filed April 13, 1889. Serial No. 307,096. (No model.)

*To all whom it may concern:*

Be it known that I, NATHANIEL A. BOYNTON, a citizen of the United States, residing in the city of New York, in the county of New York, in the State of New York, have invented a new and useful Hot-Water Heating Apparatus, of which the following, in connection with the accompanying drawings, is a description.

The invention relates to the class of water-heaters which are designed for warming apartments in dwellings and other structures by heating and circulating a body of water, the water being introduced from any convenient source into the water passages or chambers of the heater, and thence into the circuit or circuits of pipes which extend into the rooms to be warmed, the rapidity of the movement through the circuit depending on the temperature imparted to the circulating fluid.

The object of the invention is to provide at moderate cost a water-heater of the character above indicated, which shall thoroughly and effectively utilize the heat derived from the fuel consumed, the construction being such that the water-currents and the heat-currents are brought into intimate relation.

The invention consists in the novel construction hereinafter particularly described, and specifically indicated in the concluding paragraphs of this specification.

Figure 1:
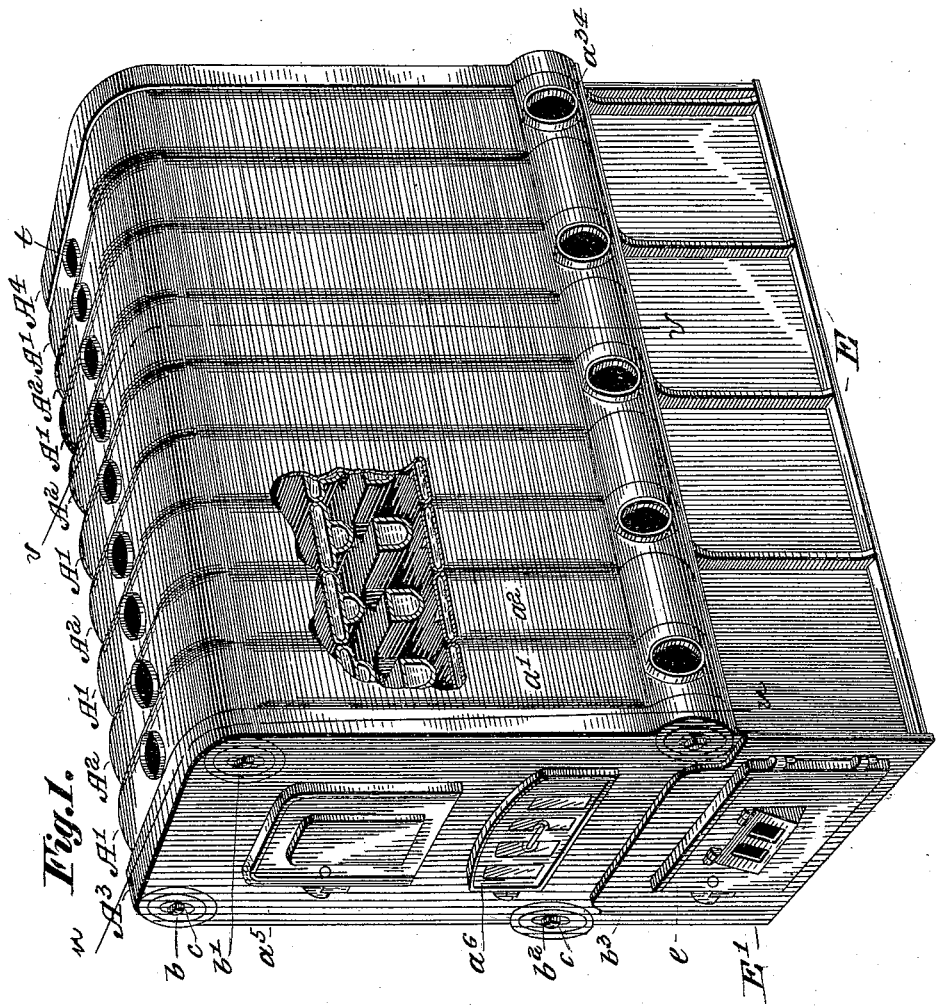
Figure 5:
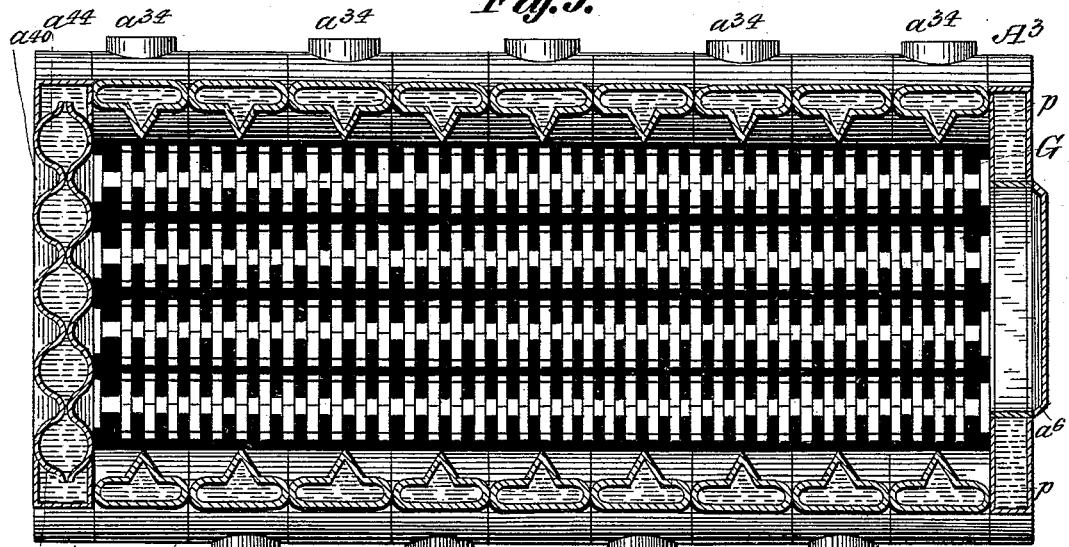
Figure 4:
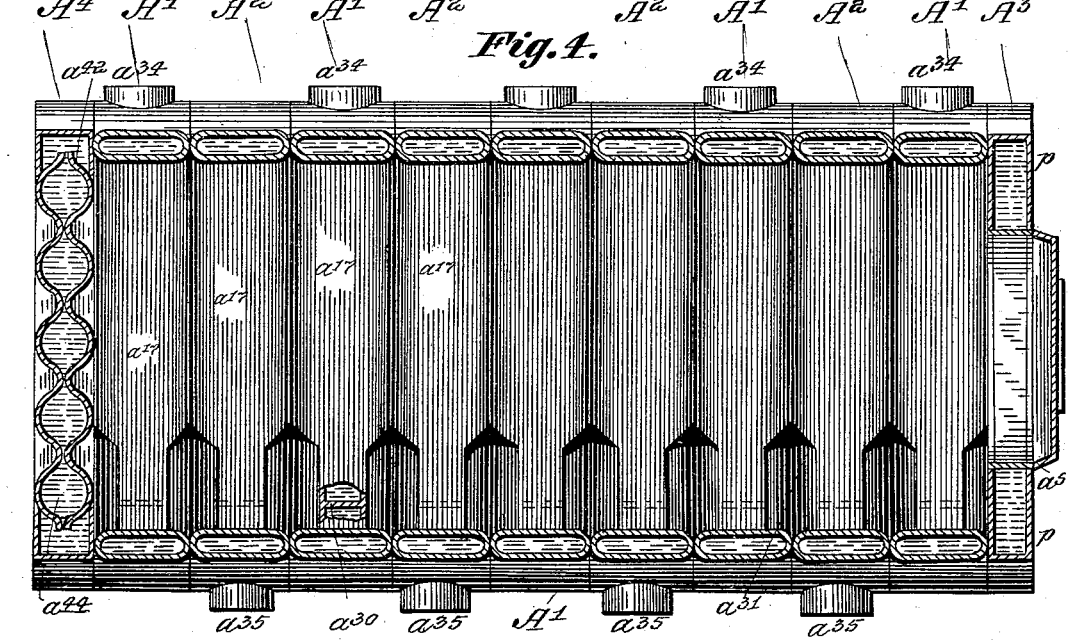

In the drawings, Figure 1 represents a perspective elevation of the water-heater proper, portions being broken away, and the transverse water-tubes exposed being represented in section. Fig. 2 represents an elevation of the fire-chamber end of the water-heater, the front plate being removed. Fig. 3 is a transverse vertical section through one of the series of water-sections of which the main body of the heater is composed, the section being taken in the line $v\ v$ of Fig. 1. Fig. 4 is a horizontal section in the plane indicated by the line $w\ w$ in Figs. 2 and 3. Fig. 5 is a top plan view, the section being taken in the plane indicated by the line $x\ x$ in Figs. 2 and 3. Fig. 6 represents a longitudinal vertical central section of the water-heater proper, as on the line $y\ y$ in Fig. 1. Fig. 7 is a transverse vertical section in the line $u\ u$ of Fig. 1. Fig. 8 is a transverse vertical section in the line $v\ v$ of Fig. 1.

In the construction of the heater A, the several intermediate water-containing sections A' A² A' A², &c., in any desired number, are placed face to face, the outer vertical portions $a'\ a^2$ and the transverse horizontal portions $a^3\ a^4$ being in close contact, so as to form a tight joint. At the front a vertical closing-section A³, having openings which are closed by doors $a^5$ and $a^6$, is applied, and at the rear a corresponding section A⁴, having near its upper extremity a smoke-discharge opening $a^8$, the whole being firmly secured together, when assembled, by means of longitudinal holding-rods $b\ b'\ b^2\ b^3$ and nuts $c$. As will be seen, this water-heater proper is supported upon a substructure or base E, which may be either of brick-masonry or of iron, as best seen in Figs. 1 and 2. Under either construction this base will be provided at the front with a closing-plate E', having an opening which affords access to the ash-pit $e'$, and which is covered by a hinged door $e$.

The water-sections A' A² are substantially alike in formation, each having right vertical water-passages $a^9$, $a^{10}$, and $a^{11}$, left vertical water-passages $a^{12}$, $a^{13}$, and $a^{14}$, horizontal water-passages $a^{15}$, $a^{17}$, $a^{19}$, $a^{21}$, and $a^{23}$, leading from the left, or near the left, to or toward the right horizontal water-passages $a^{16}$, $a^{18}$, $a^{20}$, and $a^{22}$, leading from the right, or near the right, to or toward the left, short horizontal longitudinal water-passages $a^{24}\ a^{25}$ at the top and $a^{26}\ a^{27}$ at the bottom, lateral water-inlet or return openings $a^{34}$ and $a^{35}$ at the lower extremity, a central top exit-opening $t$, coincident strengthening-ribs $a^{28}$ and $a^{29}$, and short vertical recessed or cut-away portions or half-flues $a^{30}$, $a^{31}$, $a^{32}$, and $a^{33}$, for the passage of volatile and gaseous products of combustion from the fuel-chamber or fire-box D into and out from the horizontal smoke-flues D', D², D³, and D⁴. It will be observed, however, that while the sections A' are provided with a water-inlet opening $a^{34}$ at their right lower extremity, the sections A² are closed at that point, but are provided with a like opening $a^{35}$ at their left lower extremity.

It will be seen that under the construction shown and described two distinct heat-currents ascend from the lower to the upper extremity of the water-heater, the water received through the opening $a^{34}$ passing upwardly by zigzag currents from the right toward the left, and the water received through the openings $a^{35}$ passing upwardly by similar zigzag currents from the left toward the right, the two currents being kept apart on the right by the vertical partitions $a^{36}$ and $a^{37}$, and on the left by the vertical partitions $a^{38}$ and $a^{39}$. By these the ascending currents are prevented from intermingling until they meet at the junction of the passages $a^{22}$ and $a^{23}$ below the exit-openings $t$ at the top of the heater.

It will be noted in Figs. 2 and 3 that the lowermost half-flue or cut-away portion of the transverse water-passage is of greater transverse extent than the half-flues above it. The object of this construction is to equalize the combustion of fuel, as it will be apparent that if the exit were too far to the right of the fuel-chamber the combustion at the extreme left of such chamber would be very materially diminished, if, indeed, it were not wholly prevented.

For an analogous reason the smoke-exit opening $a^8$ in the rear closing-plate $A^4$ is placed nearer to the right than to the left of the heater, thereby causing the smoke to be carried farther toward the right in seeking its exit, and thus as a consequence more equally heating the upper transverse water-passages, more especially those which are nearest the rear of the heater.

In Fig. 3 the feathered arrows denote the course of the products of combustion, the unfeathered arrows indicate the course of the water-currents, which are received at the right through the openings $a^{34}$, and the unfeathered single-barbed arrows represent the direction of the water-currents which are received at the left of the heater through the inlet-openings $a^{35}$.

In Fig. 2 the opening covered by the door $a^5$ affords access to the several horizontal smoke-passages, and enables them to be cleared of ashes, soot, and like accumulations. The door $a^6$ covers the opening to the fuel-chamber or fire-box D, and the door $e$ when unclosed discloses the ashes-chamber or ash-pit $e'$ below the grate or series of grate-bars G.

It will be understood without further description that the longitudinal holding-rods $b$, &c., are received centrally within the short horizontal longitudinal water-passages $a^{24}$, $a^{25}$, $a^{26}$, and $a^{27}$, in which position they are so remote from the point of greatest heat as not to be unduly expanded thereby, while at the same time they present no appreciable obstruction to the movement of the water-currents, or of the heat-currents, along the passages.

As already stated, the exterior portions of the water-sections are so closely fitted together as to be proof against escape of smoke or gases. The intermediate portions of the sections also—that is, the horizontal water-passages—will be in close proximity, so as practically to prevent passage of products of combustion, except through the vertical openings produced by the juxtaposition of two half-flues, as already indicated; but they will not be so closely fitted that their greater expansion will cause the joints of the exterior portion of such water-sections to open.

The coincident web-like formations or ribs $a^{28}$ and $a^{29}$, extending along both the vertical and the transverse portions of the sections, serve both to strengthen the same and to more effectually utilize the heat evolved from the burning fuel by presenting at either side of the combustion-chamber a series of obstructions, which have the effect of retarding the currents of heat and preventing their too rapid escape.

As will be seen in Fig. 7, the front closing-section $A^3$ has a vertical water-passage, as $p$, at each side, a horizontal water-passage, as $p'$, below the fuel-supply opening, a horizontal passage $p^2$ above the clearing-door opening, and a horizontal passage $p^3$ between these two openings. As seen in Fig. 8, the rear closing-section $A^4$, which, like all the other sections, is cast in a single piece, is made plain in its upper and lower portions, but intermediately is formed with coincident front and rear corrugations $a^{42}$ $a^{43}$, which, although slightly asunder at their nearest points, constitute in effect vertical tubes or water-passages $a^{44}$, which connect the horizontal water chamber or passage $a^{40}$ at the bottom with the corresponding transverse water-passage $a^{41}$ at the upper extremity of the section, through which portion, from front to rear, extend the walls of the short longitudinal smoke-flue or exit-opening $a^8$. These end or closing sections $A^3$ $A^4$ are so formed at their outer, upper, and lower extremities as to communicate with the adjacent intermediate water-sections. The tubular formation of the rear closing-section at the extremity of the fuel-chamber is designed to insure thorough utilization of the heat-products at this point.

Having described my invention, I claim—

1. In a hot-water heating apparatus, a transversely-placed water-section which extends from side to side of the heater, and which has two distinct sinuous water-passages, each of which extends from the lower to the upper extremity of such heating apparatus.

2. In a hot-water heating apparatus, a water-section which extends from side to side of such apparatus, which is provided with vertical water-passages and with horizontal water-passages, and which is provided, also, with right and left vertical partitions which separate such vertical and horizontal water-passages into two distinct series of passages, each series of which embraces both vertical and horizontal water-passages, substantially as described.

3. In a hot-water heating apparatus, the combination, with the intermediate water-sections, each having exterior vertical water-passages and each having horizontal water-passages, as $a^{20}$ $a^{21}$, which extend inwardly from such exterior vertical water-passages, of the rear closing-section $A^4$, provided with eccentrically-placed smoke-exit opening $a^8$, substantially as and for the purposes set forth.

4. A hot-water heating apparatus in which the water-heater is composed, essentially, of a front closing-section, a rear closing-section, and a series of intermediate water-sections, each of which has right and left vertical water passages or legs, which constitute the side walls of the fuel-chamber, vertical passages above such side-wall passages, horizontal water-passages which extend inwardly from such higher vertical passages, and lateral, reduced, or cut-away portions beyond the inner extremity of such horizontal passages, which together constitute vertical smoke-passages between lower and upper smoke-spaces, the front and rear closing-plates and the sections between them being secured together, substantially as specified.

5. In a hot-water heating apparatus, the series of water-circulating sections $A'$ and $A^2$, each provided with the web-like strengthening and retarding ribs $a^{28}$ and $a^{29}$, extending along both the vertical and the transverse portions of such sections, as described and shown.

6. In a hot-water heating apparatus, the combination, with the intermediate water-sections, of the rear closing water-section, communicating on either side at top and bottom with such intermediate water-sections, and provided with a smoke-flue which extends longitudinally through such closing-section.

7. In a hot-water heating apparatus, the combination, with the intermediate water-sections, of the rear closing water-section having a transverse water-passage at top and at bottom, and a series of intermediate vertical tubular water-passages, which connect such top and bottom transverse water-passages.

8. In a hot-water heating apparatus, the combination, with the central or intermediate water-sections, of the front closing water-section, provided with a clearing-opening and with a fuel-supply opening, and having right and left vertical water-passages, top, bottom, and intermediate transverse or horizontal water-passages, and rear openings which are coincident with the longitudinal water-passages of the intermediate water-sections.

NATHANIEL A. BOYNTON.

Witnesses:
BESSIE ASHLEY,
JAS. H. SCOTT.

Corrections in Letters Patent No. 407,850.

It is hereby certified that in Letters Patent No. 407,850, granted July 30, 1889, upon the application of Nathaniel A. Boynton, of New York, New York, for an improvement in "Water Heaters" errors appear requiring correction, as follows: The title of the invention should read *Hot Water Heating Apparatus;* in line 39, page 1, of the printed specification the word "plate" should read *closing-section;* in line 82, same page, a comma should be inserted after the word "right;" in line 82, page 2, a comma should be inserted after the word "fuel;" and in line 24, page 3, the word "closing-plates" should read *closing-sections;* and that the said Letters Patent should be read with these corrections therein that the same may conform to the record of the case in the Patent Office.

Signed, countersigned, and sealed this 6th day of August, A. D. 1889

[SEAL.]

CYRUS BUSSEY,
*Assistant Secretary of the Interior.*

Countersigned:

C. E. MITCHELL,
*Commissioner of Patents.*